(12) United States Patent
Henderson

(10) Patent No.: US 6,690,297 B1
(45) Date of Patent: Feb. 10, 2004

(54) AIRCRAFT FUEL MONITOR

(76) Inventor: Jack A Henderson, 10835 Wolf Creek Rd. SE., Albuquerque, NM (US) 87123

( * ) Notice: Subject to any disclaimer, the term of this patent is extended or adjusted under 35 U.S.C. 154(b) by 39 days.

(21) Appl. No.: 10/219,136

(22) Filed: Aug. 16, 2002

(51) Int. Cl.⁷ ............................................. G08B 23/00
(52) U.S. Cl. ...................................... 340/963; 340/626
(58) Field of Search ................................ 340/626, 945, 340/963

(56) References Cited

U.S. PATENT DOCUMENTS

| | | | | |
|---|---|---|---|---|
| 3,958,107 A | * | 5/1976 | Edelson et al. | 701/123 |
| 4,673,356 A | * | 6/1987 | Schmidt | 434/35 |
| 5,575,441 A | * | 11/1996 | Gervais et al. | 244/135 R |
| 5,760,712 A | * | 6/1998 | Sauer | 340/945 |
| 6,408,828 B1 | * | 6/2002 | Wheeler | 123/479 |

* cited by examiner

Primary Examiner—Thomas J Mullen, Jr.

(57) ABSTRACT

A system utilizing a two-circuit vacuum switch to monitor suction in the fuel system between the fuel selector valve and the engine-driven pump and warn the pilot of a restriction in the system or that the fuel tank from which the engine is feeding is exhausted of fuel.

5 Claims, 1 Drawing Sheet

AIRCRAFT FUEL MONITOR

BRIEF SUMMARY

The object of the invention is to provide pilots of low-wing, multi-fuel-tank aircraft with a warning that they are about to experience engine failure due to fuel starvation 1) because of a blockage or restriction in the system, usually caused by improper fuel selector position or a clogged fuel tank vent, or 2) because the fuel tank in use is exhausted of fuel. The invention provides a warning via lights on the instrument panel in sufficient time to allow the pilot to take corrective action before the engine quits. The system is low-cost and easy to install.

DETAILED DESCRIPTION

Figure 1:
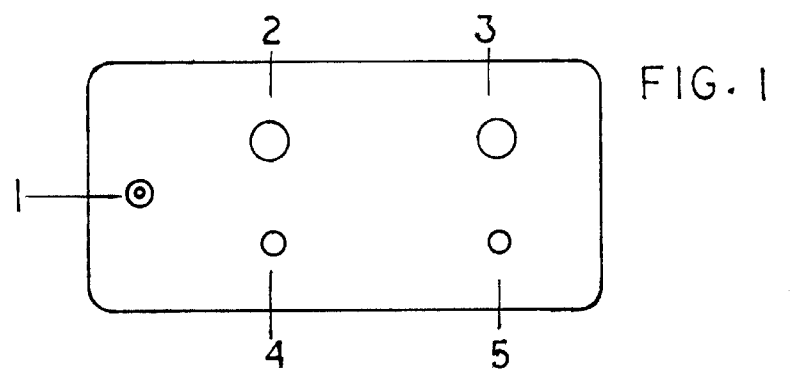
FIG. 1: Instrument panel warning light array
1) 3-way switch
2) Daylight fuel restriction warning light
3) Tank empty daylight warning light
4) Night restriction warning light
5) Tank empty night warning light
Note: 2) and 3) are bright red lights for daytime use. 4) and 5) are smaller, much dimmer lights so as not to impair a pilot's vision should he get a warning light at a critical time at night.
Figure 2:
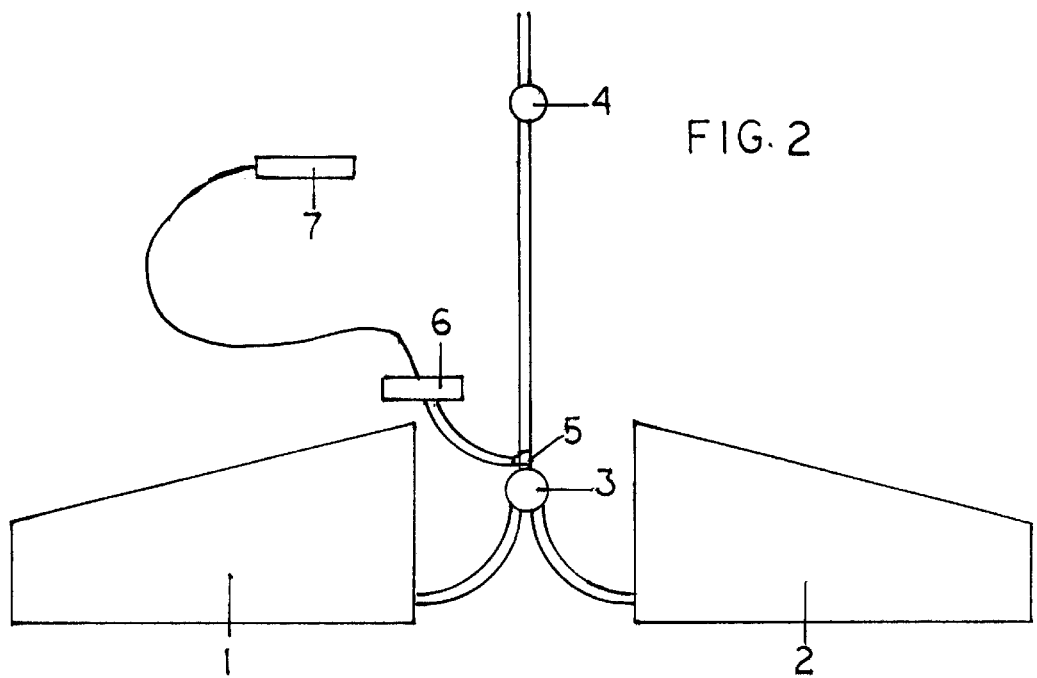
FIG. 2: A schematic of a fuel system incorporating present invention
1), 2) Left and right fuel tanks
3) Fuel selector valve
4) Engine-driven fuel pump
5) "T" fitting on outlet side of selector valve
6) Two-circuit vacuum switch
7) Instrument panel warning light array

This simple but effective warning system monitors the suction in the fuel system between the fuel selector valve and the engine-driven fuel pump. The main component of the system is a commercially available two-circuit stainless steel diaphragm vacuum switch containing two adjustable snap-action switches. A "T" fitting is installed at the outlet port on the selector valve and a tube is installed between that point and the vacuum switch.

One circuit of the vacuum switch is normally open and is set to activate at a pressure slightly above the negative pressure generated in the fuel system at takeoff power. Any obstruction in the system, such as the selector valve being in the off position or in any position except in a detent for a fuel tank, will result in increased suction in the system, activating that switch and giving the pilot an immediate warning. A plugged fuel tank air vent also will result in increased suction, activating that switch and warning the pilot to check his selector valve and/or switch fuel tanks.

The second circuit is normally closed and is set to activate at a pressure slightly below the suction existing in the system at cruise power. Its purpose is to alert the pilot that the tank the engine is feeding from is exhausted of fuel. When air in the empty tank reaches the sensor tube for the vacuum switch, the lower suction activates the switch. This usually begins with air bubbles causing intermittent activation.

The vacuum switches activate warning lights on the instrument panel, one labeled "fuel restricted" and the other "tank empty." If the pilot gets a warning light and corrects the problem in a timely fashion, the engine will not suffer a loss of power. An aural warning can be incorporated into the system that will activate if either warning light comes on.

What is claimed is:

1. An alert system for warning a pilot of a low-wing, multi-fuel-tank aircraft of an exhausted fuel tank or of a restriction in the fuel supply system, the fuel supply system including at least a fuel selector valve and an engine-driven pump, the alert system comprising:

a vacuum sensor situated between the valve and the pump and having two switches, one switch actuated in response to a condition of excessive suction indicative of a restriction in the fuel supply system, the other switch actuated in response to a condition of too little suction indicative of an exhausted fuel tank, such that the vacuum sensor provides output signals responsive to actuations of the switches; and an indicator panel responsive to the output signals of the vacuum sensor for providing an indication to the pilot when either of the vacuum sensor switches is actuated.

2. The alert system of claim 1, wherein the indicator panel includes two pairs of lights, each pair having a light indicating an exhausted fuel tank and a light indicating a restriction in the fuel supply, one pair containing larger and brighter warning lights for daytime use and the other pair containing smaller and dimmer warning lights for nighttime use.

3. The alert system of claim 2, wherein each fuel tank includes an air vent, and the restriction in the fuel supply system is caused by the valve being in an incorrect position or the air vent being clogged.

4. The alert system of claim 1, wherein the switch for monitoring a condition of excessive suction is a normally-open switch, and the switch for monitoring a condition of too little suction is a normally-closed switch.

5. The alert system of claim 1, wherein the two switches of the vacuum sensor are adjustable snap-action switches.

* * * * *